UNITED STATES PATENT OFFICE.

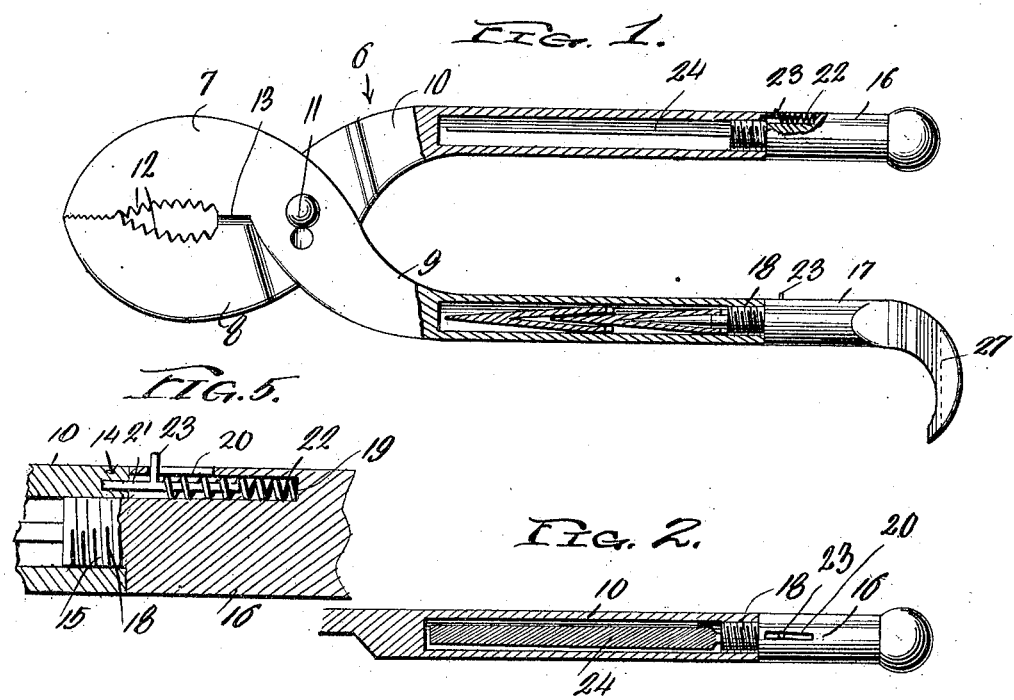

NICHOLAS J. LAHR, OF FARMER, SOUTH DAKOTA.

IMPLEMENT HOLDER.

1,404,866.   Specification of Letters Patent.   Patented Jan. 31, 1922.

Application filed November 7, 1919. Serial No. 336,501.

*To all whom it may concern:*

Be it known that I, NICHOLAS J. LAHR, a citizen of the United States, residing at Farmer, in the county of Hanson and State of South Dakota, have invented certain new and useful Improvements in an Implement Holder, of which the following is a specification.

My invention relates to new and useful improvements in implements, the handles or handle of which forms a handy container for other implements.

With the above as a primary object, the invention also has for an object to provide means for effectively retaining tools or implements in the handles or handle of an implement in such a manner that the tools may be readily removed when desired.

A further object of the invention is to provide a device of the above-named character wherein the handles of the implements contained in the handles of an implement, form handle extensions for the last-named implement handle.

A further object of the invention is to provide means whereby a plurality of tools or implements may be received in the handle of another implement, all of the first-named implements being removable simultaneously, and any one of which may be used independently.

A still further object of the invention is to provide a device including a hollow handle in which may be received a tool having a handle extension, and means for detachably securing the handle extension to the handle of the implement.

Another object of the invention is to provide a device of the above-mentioned character which is strong, durable, inexpensive to manufacture, and highly efficient in practice.

Other objects and advantages of the invention will become apparent during the course of the following description.

In the accompanying drawings, forming a part of the description and wherein like numerals are employed to designate like parts throughout the several views, Figure 1 is side elevation of the invention, parts thereof being broken away, Figure 2 is a fragmentary longitudinal section of one of the handles;

Figure 3 is a similar view of another of the handles.

Figure 4 is a perspective view of one of the handle extensions, and a tool which may be detachably associated therewith, and Figure 5 is a fragmentary section through one of the handles and handle extensions illustrating the means for preventing accidental rotation of the handle extension.

In the drawings, wherein for the purpose of illustration is shown a preferred embodiment of my invention, the numeral 6 designates, in the present instance, a pair of pliers in its entirety, but I wish it to be understood that I do not care to limit the scope of the invention in this respect. The pliers consist of a pair of jaws 7 and 8, the terminals of crossed articulated handles 9 and 10 respectively. The inner adjacent faces of the handles, adjacent the jaws, are suitably recessed in the usual manner and are pivoted together through the medium of the usual rivet or pivot pin 11. Teeth 12 are provided upon the co-acting portions of the jaws 7 and 8, as are knife edges 13, the latter forming wire cutters.

Each handle 9 and 10 is tubular from a point adjacent its articulation with the co-acting handle to the outer end, and the outer end of each handle is equipped with an inwardly extending recess 14, while the interior walls of the outer ends are screw-threaded as at 15.

Handle extensions 16 and 17 for the handles 10 and 9 respectively are each equipped with an axially-extending threaded reduced portion 18 to be engaged with the screw-threads 15 of the handle. A longitudinally extending recess 19 is provided in each extension adjacent the periphery thereof, while a slot 20 in the periphery extends into the recess. A sliding pin 21 is slidably mounted in the recess 19 and the end of the same is normally projected from the end of the handle extension and into the recess 14 of the handle through the medium of a coil spring 22 mounted in the recess 19 to surround the pin 21. One end of this spring abuts with the bottom of the recess 19 and the opposite end of the spring engages an outwardly extending grip 23, which extends through and beyond the slot 20 to form convenient means for operating the pin 21. Consequently, when the grip 23 is moved toward the free end of its handle extension, the pin 21 will become disengaged from its recess 14, thereby permitting the operator to rotate the handle extension to move the same from the handle. When the handle extension is associated with the handle, the grip 23 is held in such a position that the head of the pin 21 does not extend from the handle extension, and this extension is rotated to engage its threaded portion 18 with the threads 15 of the handle. When the threaded portion 18 has been properly seated, the grip 23 is released which permits the coil spring 22 to urge one end of the pin 21 into engagement with the recess 14 to lock the handle extension upon the handle and to prevent accidental rotation of the former.

The handle extension 16 has extending from the reduced threaded portion 18 thereof, and longitudinally thereof, a file 24, which is received within the handle 10 when the handle extension 16 is associated with this handle.

The terminal of the handle extension 17 is arcuated outwardly as at 27, the transverse free end of which is beveled and equipped with a V-shaped bifurcation 28, whereby a tack puller is provided. The threaded extension 18 of this extension 17 is equipped with a longitudinally extending integral tool 29, which in the present instance, is in the form of an awl. Oppositely disposed lugs 30 are provided upon the shank of the awl at its juncture with the portion 18, to be associated with oppositely disposed slots 31 provided in the end of a hollow tool 32 assuming in the present instance, the shape of a screw-driver. This screw-driver is hollow in order that it may receive the awl 29 whereby the slots 31 of the former may be associated with the oppositely disposed lugs 30. Manifestly, it will be apparent that the handle extension 17 may be disengaged from its respective handle and the awl 29 used independently, or when it is desired to employ the screw-driver 32, it is merely slipped over the awl so that the slots 31 engage the lugs 30 in the manner set forth whereby rotation of the screw-driver upon the awl is prevented.

The foregoing description and accompanying drawings have reference to what might be considered to be the approved or preferred form of my invention. I desire it to be understood that I may make such changes in the construction, combination, and arrangement of parts, materials, dimensions, et cetera, as may prove expedient and fall within the scope of the appended claims.

Having thus fully described my invention what I claim as new and desire to secure by Letters Patent, is:—

1. A tool comprising a handle, an element extending from said handle, a tubular implement received upon said element, and means for preventing rotation of the implement in either direction upon said element.

2. In a device of the class described, a tubular handle, a handle extension therefor, said extension being equipped with a threaded reduced portion to be engaged within said tubular handle, a longitudinally extending element extended from the end of said threaded portion, a tubular tool received upon said element, and means for preventing rotation of the tool in either direction upon said element.

3. In a device of the class described, a tubular handle, a handle extension therefor, said extension being equipped with a threaded reduced portion to be engaged within said tubular handle, a longitudinally extending element extending from the end of said threaded portion, a pair of oppositely disposed lugs on said element, a hollow tool adapted to be mounted upon said element, and said tool being provided with a pair of oppositely disposed slots for association with said lugs to prevent accidental rotation of said tool upon said element.

In testimony whereof I affix my signature in presence of two witnesses.

NICHOLAS J. LAHR.

Witnesses:
G. E. ROSTER,
G. J. McGREGOR.